Patented Dec. 12, 1944

2,364,738

UNITED STATES PATENT OFFICE 2,364,738

TEXTILE DECORATING COMPOSITIONS

Carl M. Marberg, Elmhurst, and Earl K. Fischer, Long Island City, N. Y., assignors to Interchemical Corporation, New York, N. Y., a corporation of Ohio No Drawing. Application October 18, 1941, Serial No. 415,626

2 Claims. (Cl. 260—9)

This invention is in the field of textile printing, in particular of pigment printing. It provides a new type of pigment printing paste containing as the pigment binder modified polyvinyl alcohol, the pastes being specially compounded to provide satisfactory printing properties.

Conventional textile printing has ordinarily been done with water solutions of dyestuffs containing water-soluble thickening agents in sufficient quantity to retard the spreading of the color on the fabric after printing. The dyestuff is fixed on to the fabric by some chemical process, and the thickening agent is then washed out of the fabric. The time and expense involved in this aftertreatment, added to the originally high color cost for light- and tub-fast dyes, has been a major problem in textile printing. An unsolved problem has been the reproduction of very fine designs. Since the pastes spread on the fabric after printing when thin enough to be removed sharply from fine engravings, giving blurred designs, it has been found impossible to use photogravure cylinders or extremely fine mill and die engravings. Attempts to modify these pastes by addition of wetting agents and emulsification of oils therein have not solved the basic difficulties.

In order to overcome the difficulty with the use of dyestuffs, it has long been proposed to use insoluble pigments in printing pastes. Albumen and other water-dispersible thickeners have been used to bind the pigment to the fabric, the albumen being set by heat so as to become insoluble in water. The resultant prints, however, will not withstand laundering satisfactorily, and the same printing difficulties are encountered as with dyestuff pastes.

It was also proposed, at an early date, to use ordinary oil base printing inks and colored lacquers in the decoration of fabrics; these compositions were never satisfactory as a general replacement for dyestuff printing pastes, for a variety of reasons. Relatively few binders useful in printing inks and lacquers withstand both dry cleaning and washing; and such compositions as are resistant have been generally unacceptable due to the fact that the fabrics, when printed with these lacquers, develop an undesirable stiff feel (known to the trade as "hand"), to the necessity for using large amounts of color to obtain deep shades, and to the tendency of colored markings to rub off on to other clothing and leave a mark (known as "crocking").

There has recently appeared on the market a new type of pigmented textile printing paste which has been successful as a replacement for the old type dyestuff printing paste. These pastes are described in the Jenett U. S. Patent No. 2,222,581, issued November 19, 1940; they are emulsions in which an outer continuous water-immiscible lacquer phase is thickened by an inner aqueous phase which is at least 20 per cent. of the total emulsion, by weight. Preferably, the binder of the lacquer is one which is originally soluble in ordinary organic solvents and which can be converted into an insoluble state after printing—most desirably, a readily heat-polymerizable synthetic resin, best exemplified by the plasticized urea formaldehyde resins. These pastes have not only overcome the problem of "hand" and "crocking," as relates to pigment printing, but have introduced new printing standards into the industry, because of their marked superiority in printing properties as compared to the conventional aqueous systems.

The industry has, however, one objection to these new pastes; their use of a continuous hydrophobe phase introduces new problems into an industry that is accustomed to handling water-miscible materials. Hence, the successful introduction of these pastes has served to intensify the search for the long sought for wash-fast "albumen," and to raise the standards of wash-fastness and printing qualities, which the new products must have.

Among the water-dispersible products previously suggested for pigment printing, and which are somewhat superior to albumen in wash-fastness, are certain cellulose ethers and hydroxy ethers, water-soluble urea formaldehyde resins which are set by heat on the fabric, and polyvinyl alcohols, which are printed in combination with formaldehyde or dimethylol urea, and insolubilized by reaction between the ingredients induced by heat. None of these products, however, has been used with complete success in pigment printing, for two reasons—their printing properties are poor, particularly in that they do not utilize the full color value of the pigments used with them, and their wash-fastness, while considerably better than albumen, leaves much to be desired.

Attempts to improve the color value obtained with polyvinyl alcohol by the addition of water-dispersible thickeners ordinarily produce two effects. In the first place, the amount of binder is so markedly increased that the prints become stiff and boardy. Secondly, the prints tend to become more water-sensitive and less resistant to washing as the binder content increases, apparently because of reduced adhesion to the fabric in the case of water-resistant additions, and because of water-susceptibility with materials such as starch and the water-soluble gums.

We have discovered that substantially improved color value can be obtained in printing with pigmented aqueous polyvinyl alcohol compositions, by including in the composition from about .1% to 1% of an alginate, preferably in admixture with a setting agent for the polyvinyl alcohol, such as formaldehyde or a water-soluble carbamide resin.

The alginates have the property, in combination with the polyvinyl alcohols, of giving increased color value without causing boardiness of the prints, and without decreasing the wash-resistance of the markings substantially, either by way of reducing adhesion or increasing water-sensitivity.

Typical examples of our invention are the following:

Example 1

|  | Grams |
|---|---|
| Polyvinyl alcohol (E. I. du Pont de Nemours and Company—PVA 403—10% aqueous solution | 100 |
| Ciba water-soluble melamine-formaldehyde resin | 4 |
| Tributyl phosphate | 1 |
| Keltex (potassium alginate) | 1 |
| Monastral Green, 20% aqueous slurry | 20 |
| Water | 73.5 |
| Pyridine | 0.5 |

The melamine-formaldehyde resin is dissolved in 10 cc. of the water. The potassium alginate is swelled in the rest of the water, which is sufficiently warmed, and then all the constituents are mixed under a high-speed stirrer. A paste of good printing properties is obtained.

Example 2

|  | Grams |
|---|---|
| Polyvinyl alcohol (PVA 403), 10% aqueous solution | 100 |
| Ciba — water-soluble melamine-formaldehyde resin | 4 |
| Tributyl phosphate | 1 |
| Keltex | 1 |
| Heliogen Blue (22% pulp) | 9 |
| Water | 85 |

This gives a blue print with fairly good color value. After heating the prints for five minutes at 250° F., the prints are reasonably wash-resistant.

The tributyl phosphate is used to reduce foaming.

Example 3

|  | Grams |
|---|---|
| Polyvinyl alcohol (PVA 403), 10% aqueous solution | 100 |
| Agar-agar, dissolved in | 2 |
| Hot water | 50 |
| 88% formaldehyde | 15 |
| Indian Red, 20% pulp | 10 |
| Tributyl phosphate | 1 |
| Beetle cream (50% aqueous, water-soluble, urea-formaldehyde partial polymer) | 12 |
| Water | 10 |

The constituents are mixed under a high-speed stirrer.

Example 4

|  | Grams |
|---|---|
| Polyvinyl alcohol (PVA 403), 10% aqueous solution | 100 |
| Keltex (potassium alginate) | 0.5 |
| 2-ethyl hexaldehyde | 4 |
| Heliogen Green G, 20% aqueous pulp | 10 |
| Solvesso #2 (hydrogenated naphtha—B. R. 135—177° C.) | 10 |
| Water | 75.5 |

The alginate is dissolved in the heated water, and the aqueous constituents are mixed. Then the non-aqueous constituents, previously mixed, are added slowly with stirring. The resultant emulsion ink is printed on cotton cloth, and gives an excellent print. On heating, the aldehyde reacts with the polyvinyl alcohol to produce a product of satisfactory wash fastness.

Changes can of course be made in the examples without departing from the scope of the invention. As indicated above, the alginate may be varied as desired; we have used sodium alginate, agar and other similar products. Polyvinyl alcohols of various molecular weights may be used. The improvement in color value is observable with or without an insolubilizing agent.

While the products produced are particularly desirable for printing, they may also be used for pigment dyeing, by forcing the thickened composition through the fabric, in the manner described in the Cassel U. S. Patent No. 2,248,696, issued July 8, 1941.

We claim:

1. A textile decorating composition yielding improved pigment color value on fabric, comprising a pigment dispersed in an aqueous polyvinyl alcohol solution of such concentration that the composition has sufficient body to be printable from an intaglio plate, but which alone yields poor color value on fabric, and from .1% to 1% of a water-soluble alginate, whereby the color value obtained is substantially improved.

2. A textile decorating composition yielding improved pigment color value on fabric, comprising a pigment dispersed in an aqueous polyvinyl alcohol solution of such concentration that the composition has sufficient body to be printable from an intaglio plate, but which alone yields poor color value on fabric, an insolubilizing agent for the polyvinyl alcohol, and from .1% to 1% of a water-soluble alginate, whereby the color value obtained is substantially improved.

CARL M. MARBERG.
EARL K. FISCHER.